3,044,847
SELF-MODERATING FERTILE COMPOUNDS
David T. Peterson and Joachim Rexer, Ames, Iowa, assignors to the United States of America as represented by the United States Atomic Energy Commission
Filed Apr. 11, 1960, Ser. No. 21,569
8 Claims. (Cl. 23—14.5)

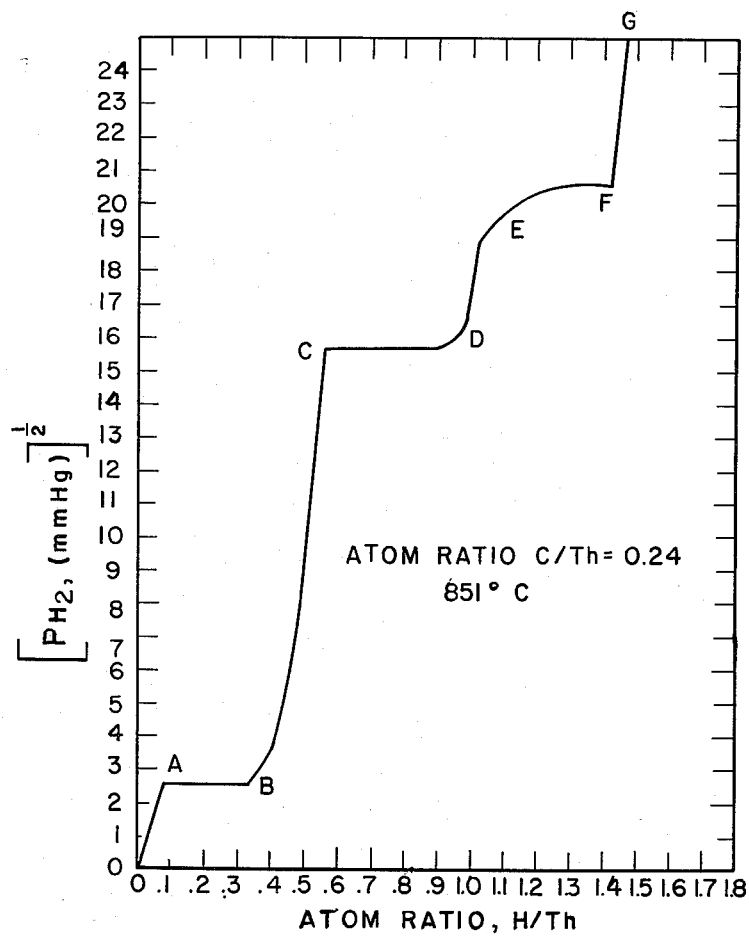

The invention relates to novel self-moderating fertile compounds suitable for use in nuclear reactors, more particularly to self-moderating thorium compounds suitable for use in nuclear reactors of the breeder type.

Of the fertile isotopes which may be transmuted, or "bred," by neutron irradiation into fissionable material, thorium-232 is the most abundant in nature. When placed in a neutron flux in a nuclear reactor it is transmuted into the fissionable isotope uranium-233 according to the following reactions:

$$_{90}Th^{232} + _0n^1 \longrightarrow {_{90}Th^{233}} + Y$$

$$_{90}Th^{233} \xrightarrow{235 \text{ min.}} {_{91}Pa^{233}} + {_{-1}e^0}$$

$$_{91}Pa^{233} \longrightarrow {_{92}U^{233}} + {_{-1}e^0}$$

It is, of course, possible to carry out these reactions simply by placing some thorium within the core of an ordinary thermal reactor, but when more than a very small amount of thorium is so placed the thermal neutron flux falls off rapidly due to neutron absorption by the thorium, and the reaction is brought to a halt. If the amount of thorium is kept within the limits where it will not so interfere with the reaction, the amount of uranium-233 produced will be so small as not to be equal to the amount of fissionable material consumed, and there will therefore be no "profit" in fissile material.

To remedy this situation "breeder" reactors have been designed with comparatively small, "enriched" cores, surrounded by "blankets" of fertile material such as thorium. Examples of such reactors are to be found in the application of Glenn T. Seaborg and Raymond W. Stoughton, Serial No. 599,068, filed June 12, 1945, now U.S. Patent No. 2,951,023, and in the application of Harold C. Urey et al., Serial No. 751,734, filed June 2, 1947. Not all the neutrons radiating out of the core into the blanket have the proper energies for bringing about the desired transmutation reactions in the blanket; they must be moderated, not necessarily to the "thermal" level, but somewhat above it, depending on the particular fertile material. In the case of thorium, neutrons with energies of 20-80 ev. have the greatest breeding efficiency, and the goal of designers is to so arrange the moderator as to cause the neutron energy spectrum to "peak" within this range.

In order to show the greatest "profit" from a reactor as a whole it is necessary to utilize the neutron energy as productively as possible; neutrons that simply lose their energy through successive collisions with particles of the moderator represent so much loss. Since transmutation reactions tend to take place on the surfaces of bodies of fertile material, the more finely these can be subdivided and intermixed with the moderator the less of the latter is required. The ultimate in such intermixture would be a satisfactory compound in which the fertile atoms and moderator atoms are chemically bonded; such a compound may be called a self-moderating fertile material since when it is used no exterior moderator is required.

Thorium hydride has been proposed for this purpose, but has been found to decompose at the temperatures encountered in nuclear reactor blankets. Thorium monocarbide, which is formed by reacting thorium with carbon at high temperatures such as in an electric arc or electric furnace, is stable at blanket temperatures, but more wasteful of the neutron energy due to the fact that carbon is a less efficient moderator under the circumstances than is hydrogen.

It is, accordingly, an object of the invention to provide a self-moderating fertile material which will be stable at temperatures encountered in nuclear reactor blankets, and at the same time will not be wasteful of neutron energy.

It is a more particular object of the invention to provide such a self-moderating fertile material which shall be a chemically bonded thorium compound.

It is a more particular object of the invention to provide a method for making a heat-stable, self-moderating thorium compound with a carbon to thorium ratio of less than one to one.

All the foregoing objects are attained by our discovery of two novel compounds which we have designated thorium carbide-(thorium hydride) and thorium carbide-2-(thorium hydride), the chemical formulas for which, respectively, are:

$$ThC \cdot ThH_2$$
$$ThC \cdot 2ThH_2$$

The above compounds are prepared by reacting thorium monocarbide and thorium metal, either intimately intermixed together or in alloy form, in an atmosphere of hydrogen. Preferably the reactants should be present in stoichiometric amounts so that the resulting products will be pure, rather than a mixture. Details of the reaction are best understood by reference to the drawing which is a graph in which the square root of hydrogen pressures in millimeters of mercury, as ordinates, are plotted against the hydrogen to thorium atom ratio of an alloy at 851° C. of thorium monocarbide and thorium metal in such proportions that the over-all carbon to thorium atom ratio in the alloy was 0.24. A graph of this character is known as an isotherm and its comparatively steep portions, from the origin to point A, from point B to C, from D to E, and from F to G are due to the increasing physical absorption of hydrogen in the atomic state by the metal-carbide mixture, which is a function of the square root of the hydrogen pressure in accordance with Sievert's law of isothermal hydrogen absorption:

$$C_H = k\sqrt{P_{H_2}}$$

In the above expression, $C_H$ denotes the atom concentration of hydrogen in the solid phase material; $P_{H_2}$ denotes the pressure of hydrogen in the ambient gas phase in contact with the solid phase; and $k$ is a constant for any given temperature.

The flat, or nearly flat portions of the isotherm curve, from point A to point B, from point C to point D, and from point E to point F, are to be explained in accordance with the Gibbs phase rule as being due to the appearance of an additional phase in the alloy of thorium monocarbide and thorium metal. Formation of a new compound begins at point A and is completed at point B; likewise a second compound begins to form at point C and is completed at D, and a final or third compound begins at point E and is completed at F.

It will be observed that the point of completion of the second compound, point D, is directly above the hydrogen to thorium atom ratio of 1.0, thereby indicating that the compound, when fully formed, has a composition consistent with the formula $ThC \cdot ThH_2$. Likewise at the point F, where formation of the third compound is complete, the H to Th ratio is at 1.33, thereby supporting the validity of the formula $ThC \cdot 2ThH_2$.

In carrying out our reactions to form $ThC \cdot ThH_2$ and $ThC \cdot 2ThH_2$ we have found that there is a critical temperature range of from 500 to 950° C. in both cases;

below this range the reactions do not proceed, and above it decomposition of the products begins.

In producing $ThC \cdot ThH_2$ the pressure is a critical matter since the pressure at which this compound is formed is determined by the shape of the isotherm curve of the temperature which is being employed. As the particular isotherm curve of the drawing indicates, the critical pressure for forming this compound at 851° C. is from about $(15.5)^2$ mm. Hg to $(18.5)^2$ mm. Hg or from about 240 to 350 mm. Hg. Above this range $ThC \cdot 2ThH_2$ will begin to form, while below it the only compound that will form is the as yet unstudied and uncharacterized compound formed between points A and B.

As is well established in the metallurgical arts, at other temperatures the resulting isotherm curves will form a family relationship with the curve shown in the drawing, being displaced up or down as "$k$" varies with the isothermal temperature. In these reactions an increase in temperature displaces the isothermic curve upward since the dissociation pressure of our compounds within the temperature range concerned is sufficiently great to overcome the normal thermodynamic effect of increased reaction rate due to increased temperature.

In the case of $ThC \cdot 2ThH_2$, its formation may be carried out without any great degree of care since when temperature is increased the increase of "$k$" and the usual thermodynamic effects of heat merely cooperate to hasten the reaction, without any fear of an unwanted by-product being produced, since nothing else will form on increasing the pressure, no matter how far. For these reasons, $ThC \cdot 2ThH_2$ can be produced much more easily and quickly than $ThC \cdot ThH_2$; the former was successfully produced in 20 hours with hydrogen at atmospheric pressure at 850° C., whereas $ThC \cdot ThH_2$ required about 11 days within its hydrogen pressure range of formation at 856° C.

The foregoing is, however, on the whole fortunate since the easily produced $ThC \cdot 2ThH_2$ is to be preferred in most situations over the less easily produced $ThC \cdot ThH_2$ as a self-moderating nuclear material due to its comparatively low carbon to thorium atomic ratio of one to three, and the greater hydrogen to thorium atomic ratio of four to three.

In addition to the evidence of the correctness of the formulas of our compounds from the isotherm curve, further substantiation is found from reacting strictly stoichiometric amounts, as indicated by the formulas, of thorium monocarbide and thorium; in both cases uniformly crystalline, apparently homogeneous materials result.

Superficially, there is some resemblance between $ThC \cdot ThH_2$ and $ThC \cdot 2ThH_2$; both are grayish, brittle, polycrystalline materials with a metallic lustre. However, when crushed in a diamond mortar and sifted through a 200-mesh screen the resulting powders give different Debye-Scherrer X-ray diffraction patterns. The pattern produced by the powdered $ThC \cdot ThH_2$ indicates that it had a hexagonal close-packed structure with $a_0 = 3.816$ A. and $c_0 = 6.302$ A. The Debye-Scherrer pattern of $ThC \cdot 2ThH_2$ was less conclusive, although clearly quite different from that of $ThC \cdot ThH_2$. To clarify the matter, a single crystal of $ThC \cdot 2ThH_2$ was placed in an X-ray diffraction apparatus of the Bragg type, and it was found to have a monoclinic structure with $a_0 = 6.50$ A, $b_0 = 3.80$ A., $c_0 = 10.91$ A., and $\beta = 119°$. Both these X-ray studies confirm the correctness of our formulas $ThC \cdot ThH_2$ and $ThC \cdot 2ThH_2$.

Both $ThC \cdot ThH_2$ and $ThC \cdot 2ThH_2$ are extremely stable to thermal decomposition. The thermal decomposition temperature of the latter at atmospheric pressure has been established as at about 1025° C. and that of $ThC \cdot ThH_2$ is even higher as might be expected from its smaller hydrogen to thorium ratio. Such decomposition temperatures are, of course, far above any temperature to be expected in a nuclear reactor so that the use of these compounds as fertile materials is safe by a wide margin.

Example I 244.13 grams of thorium monocarbide and 232.12 grams of metallic thorium are melted together at 851° C. in an atmosphere of hydrogen at a pressure of 300 mm. Hg for eleven days. On cooling a uniform appearing, gray polycrystalline material with a metallic lustre is found to have formed. A portion of the material is ground in a diamond mortar to a powder and the powder is placed on a 200-mesh screen and shaken. The powder passing through the screen is placed in an X-ray apparatus and a Debye-Scherrer diffraction photograph taken. Examination of the photograph reveals a clearly defined ring pattern from which $a_0$ is computed to be 3.816 A. and $c_0$ to be 6.302 A. with the molecular formula $ThC \cdot ThH_2$.

Example II 244.13 grams of thorium monocarbide and 464.24 grams of thorium metal are melted together at 850° C. in an atmosphere of hydrogen at atmospheric pressure for 20 hours. On cooling a uniform appearing, gray polycrystalline material with a metallic lustre is found to have formed. A single crystal of the material is removed from the mass and placed in an X-ray apparatus of the Bragg type and X-ray diffraction values taken of the crystal in various orientations. From these values $a_0$ was found to be 6.50 A., $b_0$ 3.80 A., $c_0$ 10.91 A., $\beta$ 119°, and the formula of the molecule $ThC \cdot 2ThH_2$.

It will be understood that this invention is not to be limited to the details given herein but that it may be modified within the scope of the appended claims.

What is claimed is:

1. A thorium carbide-$x$-(thorium hydride), where $x$ is an integer from 1 to 2.
2. A compound of the group consisting of thorium carbide-(thorium hydride) and thorium carbide-2-(thorium hydride), having the respective formulas: $ThC \cdot ThH_2$ and $ThC \cdot 2ThH_2$.
3. Thorium carbide-(thorium hydride), having the formula $ThC \cdot ThH_2$.
4. Thorium carbide-2-(thorium hydride), having the formula $ThC \cdot 2ThH_2$.
5. The method of making thorium carbide-(thorium hydride) comprising reacting thorium monocarbide and thorium within the temperature range of 500–950° C. in an atmosphere consisting essentially of hydrogen at sufficient pressure to cause thorium carbide-(thorium hydride) only to form.
6. The method of claim 5 where the temperature is about 851° C. and the pressure of the hydrogen is from about 240 to 350 millimeters of mercury.
7. The method of making thorium carbide-2-(thorium hydride), comprising reacting thorium monocarbide and thorium within the temperature range of 500–950° C. in an atmosphere consisting essentially of hydrogen at sufficient pressure to cause it to form.
8. The method of claim 7 where the temperature is about 851° C. and the pressure of the hydrogen is over 350 millimeters of mercury.

References Cited in the file of this patent

UNITED STATES PATENTS

| | | |
|---|---|---|
| 2,872,307 | Wilhelm et al. | Feb. 3, 1959 |
| 2,928,721 | Mason et al. | Mar. 15, 1960 |

OTHER REFERENCES

Glasstone: Principles of Nuclear Engineering, Van Nostrand, 1955, pp. 5, 17, 39 and 830.

UNITED STATES PATENT OFFICE
CERTIFICATE OF CORRECTION

Patent No. 3,044,847

July 17, 1962

David T. Peterson et al.

It is hereby certified that error appears in the above numbered patent requiring correction and that the said Letters Patent should read as corrected below.

Column 1, lines 42 to 44, strike out ", and in the application of Harold C. Urey et al., Serial No. 751,734, filed June 2, 1947".

Signed and sealed this 12th day of February 1963.

(SEAL)
Attest:

ERNEST W. SWIDER
Attesting Officer

DAVID L. LADD
Commissioner of Patents